(12) United States Patent
Stansberry et al.

(10) Patent No.: US 7,824,650 B2
(45) Date of Patent: Nov. 2, 2010

(54) ENHANCED DIRECTIONAL CONDUCTIVITY OF GRAPHITIZABLE FOAM

(75) Inventors: Peter G. Stansberry, North Olmstead, OH (US); Leonard Singer, Oberlin, OH (US)

(73) Assignee: GrafTech International Holdings Inc., Parma, OH (US)

( * ) Notice: Subject to any disclaimer, the term of this patent is extended or adjusted under 35 U.S.C. 154(b) by 448 days.

(21) Appl. No.: 11/677,328

(22) Filed: Feb. 21, 2007

(65) Prior Publication Data

US 2008/0199390 A1    Aug. 21, 2008

(51) Int. Cl.
    C01B 31/04    (2006.01)
    C01B 15/16    (2006.01)
    C01B 31/00    (2006.01)
    B01J 19/08    (2006.01)
    B29C 65/00    (2006.01)
    B29C 47/00    (2006.01)
    B29C 47/76    (2006.01)

(52) U.S. Cl. ............ 423/448; 423/312.2; 423/445; 156/78; 156/245; 264/29.6; 264/29.7; 264/42; 264/46.5; 264/101

(58) Field of Classification Search .......... None
See application file for complete search history.

(56) References Cited

U.S. PATENT DOCUMENTS

| | | | |
|---|---|---|---|
| 3,574,653 A | 4/1971 | Edstrom et al. | 106/279 |
| 3,991,170 A * | 11/1976 | Singer | 423/499.1 |
| 5,868,974 A | 2/1999 | Kearns | 264/29.6 |
| 5,888,469 A | 3/1999 | Stiller et al. | 423/445 |
| 5,961,814 A | 10/1999 | Kearns | 208/39 |
| 6,013,371 A | 1/2000 | Hager et al. | 428/408 |
| 6,033,506 A * | 3/2000 | Klett | 156/78 |
| 6,037,032 A | 3/2000 | Klett et al. | 428/71 |
| 6,261,485 B1 | 7/2001 | Klett | 264/29.6 |
| 6,287,375 B1 | 9/2001 | Klett | 106/122 |
| 6,344,159 B1 | 2/2002 | Klett | 264/29.7 |
| 6,387,343 B1 | 5/2002 | Klett | 423/448 |
| 6,398,994 B1 | 6/2002 | Klett | 264/42 |
| 6,399,149 B1 | 6/2002 | Klett et al. | 427/230 |
| 6,430,935 B1 | 8/2002 | Klett et al. | 62/3.3 |
| 6,506,341 B2 | 1/2003 | Li et al. | 422/52 |
| 6,656,443 B2 | 12/2003 | Klett | 423/445 |
| 6,663,842 B2 | 12/2003 | Klett | 423/448 |
| 6,673,328 B1 | 1/2004 | Klett et al. | 423/445 |
| 6,763,671 B1 | 7/2004 | Klett et al. | 62/259.3 |
| 6,776,936 B2 | 8/2004 | Hardcastle et al. | 264/29.1 |
| 6,780,505 B1 | 8/2004 | Klett et al. | 428/367 |
| 2002/0066368 A1 | 6/2002 | Zornes | |

OTHER PUBLICATIONS

Anisotropy of the Thermal Expansion of a Highly-Oriented Mesophase Pitch by Singer, 19th Biennial Conference of Carbon, Penn State, Jun. 25-30, 1989.

* cited by examiner

*Primary Examiner*—Melvin C Mayes
*Assistant Examiner*—Guinever S Gregorio
(74) *Attorney, Agent, or Firm*—Waddey & Patterson, P.C.; James R. Cartiglia (57) ABSTRACT

A graphitizable carbon foam having enhanced directional thermal conductivity is provided. The mesophase portions of a mesophase pitch are aligned with each other to create an oriented mesophase pitch, which is then foamed to provide an oriented pitch foam. The pitch foam can be heated to carbonize the pitch thereby forming an oriented carbon foam. The carbon foam can be further heated to provide an oriented graphite foam.

6 Claims, 5 Drawing Sheets

ENHANCED DIRECTIONAL CONDUCTIVITY OF GRAPHITIZABLE FOAM

BACKGROUND OF THE INVENTION

1. Field of the Invention

The present invention relates to the production of high strength carbon foams having a direction of enhanced conductivity, especially thermal conductivity. The foams can be graphitized to provide a graphite foam having a direction of enhanced thermal and electrical conductivity. Methods for the production of such foams are also disclosed.

2. Description of the Prior Art

Natural and synthetic pitches, as is well known, are complex mixtures of organic compounds which, except for certain rare paraffinic-base pitches derived from certain petroleums, such as Pennsylvania crude, are made up essentially of fused ring aromatic hydrocarbons and are, therefore, said to have an aromatic base. Since the molecules which make up these organic compounds are comparatively small (average molecular weight not more than a few hundred) and interact only weakly with one another, such pitches are isotropic in nature. On heating these pitches under quiescent conditions at a temperature of about 350° C.-450° C., however, either at constant temperature or with gradually increasing temperature, small liquid spheres begin to appear in the pitch, which gradually increase in size as heating is continued. When examined by electron diffraction and polarized light techniques, these spheres are shown to consist of layers of oriented molecules aligned in the same direction. As these spheres continue to grow in size as heating is continued, they come in contact with one another and gradually coalesce with each other to produce larger masses of aligned layers. As coalescence continues, domains of aligned molecules much larger than those of the original spheres are formed. These domains come together to form a bulk mesophase wherein the transition from one oriented domain to another sometimes occurs smoothly and continuously through gradually curving lamellae and sometimes through more sharply curving lamellae. The differences in orientation between the domains create a complex array of polarized light extinction contours in the bulk mesophase corresponding to various types of linear discontinuity in molecular alignment. The ultimate size of the oriented domains produced is dependent upon the viscosity, and the rate of increase of the viscosity, of the mesophase from which they are formed, which, in turn are dependent upon the particular pitch and the heating rate. In certain pitches, domains having sizes in excess of two hundred microns up to several hundred microns are produced. In other pitches, the viscosity of the mesophase is such that only limited coalescence and structural rearrangement of layers occur so that the ultimate domain size does not exceed one hundred microns.

The highly oriented, optically anisotropic material produced by treating pitches in this manner has been given the term "mesophase", and pitches containing such material are known as "mesophase pitches". Such pitches, when heated above their softening points, are mixtures of two immiscible liquids, one the optically anisotropic, oriented mesophase portion, and the other the isotropic non-mesophase portion. The term "mesophase" is derived from the Greek "mesos" or "intermediate" and indicates the pseudo-crystalline nature of this highly-oriented, optically anisotropic material.

The highly oriented mesophase spheres which begin to appear in a pitch when it is gradually heated are not only optically anisotropic, but also diamagnetically anisotropic, i.e., they have a large diamagnetic susceptibility in a direction normal to the layers of oriented molecules, and a small susceptibility in a direction parallel to these layers. As a result, when pitch containing such spheres is subjected to a magnetic field, the spheres tend to align themselves with their layer planes parallel to the direction of the magnetic field. However, while this orienting effect causes an alignment of the layer planes of the spheres in a direction parallel to that of the magnetic field, the polar or c-axes of the spheres remain free to rotate in a plane perpendicular to the direction of the magnetic field, so that there is no parallel alignment of the polar axes of the spheres.

In accordance with the Singer U.S. Pat. No. 3,991,170, the details of which are incorporated herein by reference, it has been shown that mesophase pitches wherein the layer planes of the mesophase portions of such pitches are substantially aligned in a single parallel direction, and the c-axes of said planes are substantially aligned in a single parallel direction, can be produced by subjecting a mesophase pitch in its molten state to rotational motion relative to a surrounding magnetic field about an axis perpendicular to the direction of that field. The magnetic field subjects the mesophase portions of the pitch to a diamagnetic force which tends to align the layer planes of said mesophase portions in a direction parallel to that of the magnetic field, and when the pitch is simultaneously rotated relative to the field about an axis perpendicular to the field, this diamagnetic force also acts to align the c-axes of said layer planes parallel to the axis of rotation. This unique orientation can be obtained by continuously spinning the pitch in the magnetic field, or rotating the field about the pitch.

The Singer patent also teaches that solid pitch articles can be produced when the planes of the mesophase portions of the pitch are substantially aligned in a single parallel direction, and the c-axes of said planes are substantially aligned in a single parallel direction, thus producing a pitch article which has a preferred plane of increased thermal and electrical conductivity over and beyond that achieved by thermal processes alone.

Further development of the Singer process has been shown in Singer, "Anisotropy of the Thermal Expansion of a Highly-Oriented Mesophase Pitch", presented at the 19th Biennial Conference on Carbon, at the Pennsylvania State University, Jun. 25-30 (1989), the details of which are incorporated herein by reference.

The prior art also includes a number of processes for producing carbon foams, which have properties of low density coupled with relatively high thermal and electrical conductivity. These foams have their thermal and electrical conductivity substantially identical in any direction. At least two processes have been proposed for the production of such carbon foams with high thermal conductivity. These foams have typically been prepared from so called mesophase pitch. A first technique for production of such foams has involved the injection or saturation of the pitch with a blowing agent, followed by a subsequent drop in pressure to flash the blowing agent and thus foam the pitch. A second process developed at Oak Ridge National Laboratory, has eliminated the use of the blowing agent and instead has heated the pitch under pressure to a temperature sufficient to cause gasses to evolve directly from the pitch and foam the pitch. Both such processes typically start with solid pitch material which has been pulverized into a granular or powder form.

The first type such process, involving the injection of blowing agents and subsequent flashing of the pitch is shown in U.S. Pat. No. 5,868,974 to Kearns, the details of which are incorporated herein by reference. The Kearns process produces a carbon pitch by the steps of:

(a) pressing a quantity of a pitch to provide a pressed article;
(b) placing the pressed article in a pressure vessel;
(c) introducing an inert gas into the pressure vessel under an elevated pressure of about 200-500 psi;
(d) heating the pressed article within the pressure vessel to about 10° to 40° C. above the melting temperature of the pitch;
(e) introducing additional inert gas, under pressure, to obtain a final pressure within the pressure vessel of about 1,000 to 1,500 psi;
(f) holding the pressure vessel and the compressed article under pressure for about 10 to 40 minutes;
(g) venting the pressure vessel to atmospheric pressure, thereby providing a porous foam;
(h) stabilizing the porous foam at an elevated temperature in an oxygen containing environment; and
(i) cooling the resulting, stabilized porous foam to ambient temperature at a cooling rate of about 0.1° to about 0.5° C. per minute.

The porous pitch foam can be converted to a porous carbon foam by heating the pitch foam in an inert atmosphere to a temperature sufficient to carbonize the pitch. The porous carbon foam can be converted to a porous graphitic foam by heating the carbon foam in an inert atmosphere to a temperature sufficient to graphitize the carbon foam.

The second such process which eliminates the injection of the inert gas or blowing agent, is exemplified by U.S. Pat. No. 6,033,506 to Klett, the details of which are incorporated herein by reference. By the Klett process a carbon foam can be produced by following the steps of:
(a) selecting an appropriate mold shape;
(b) introducing pitch to an appropriate level in a mold;
(c) purging air from the mold;
(d) heating the pitch to a temperature sufficient to coalesce the pitch into a liquid;
(e) applying an inert fluid at a static pressure up to about 1,000 psi;
(f) heating the pitch to a temperature sufficient to cause gasses to evolve and foam the pitch;
(g) heating the pitch to a temperature sufficient to coke the pitch; and
(h) cooling the foam to room temperature with a simultaneous release of pressure to produce a carbon foam.

The carbon foam so produced can be converted to a graphitic foam by heating the carbon foam article to a temperature sufficient to graphitize the carbon foam.

The carbon foams and/or graphitic foams produced by either the Kearns or Klett processes are generally isotropic in that their thermal and electrical conductivities do not vary dependent upon direction within the foam article.

Additional details on developments related to the Klett type process are found in U.S. Pat. Nos. 6,037,032; 6,261,485; 6,287,375; 6,344,159; 6,387,343; 6,398,994; 6,399,149; 6,430,935; 6,656,443; 6,663,842; 6,673,328; 6,763,671; and 6,780,505; the details of all of which are incorporated herein by reference. It should be noted that foaming using the methods of Kearns or Klett can result in foams with some directionality of properties in the with-rise direction, primarily because of mechanical shearing during bubble formation, although the directionality achieved by Kearns or Klett is insufficient for many purposes.

SUMMARY OF THE INVENTION

By the present invention a process is provided for producing graphitizable foams which have enhanced directional thermal and electrical conductivity beyond that achievable by the current art. The process generally involves steps of:
(a) providing a mesophase pitch having mesophase portions, each mesophase portion comprising layer planes of aligned molecules;
(b) aligning the layer planes of the mesophase portions of the mesophase pitch with each other to create an oriented mesophase pitch;
(c) foaming the oriented mesophase pitch thereby forming an oriented pitch foam with enhanced thermal and electrical conductivity in directions corresponding to the orientation of the layer planes of the mesophase portions of the mesophase pitch; and
(d) heating the pitch foam to a temperature sufficient to carbonize the pitch thus providing an oriented carbon foam.

The oriented carbon foam can then be graphitized by heating the oriented carbon foam to a temperature sufficient to graphitize the carbon foam.

In one embodiment the alignment of the layer planes of the mesophase portions of the mesophase pitch with each other to create an oriented mesophase pitch is preferably performed in accordance with the Singer process of U.S. Pat. No. 3,991,170. Furthermore, the enhanced alignment can be optimized by also conducting the foaming and carbonizing steps while continuing to rotate the oriented pitch and/or the oriented pitch foam in a magnetic field in a manner similar to the Singer process.

In a second embodiment the alignment of the layer planes of the mesophase portions of the mesophase pitch is accomplished by physically manipulating the molten mesophase pitch, preferably by calendering, to impart a preferred orientation of molecular ordering parallel to the plane of the sheet. The mesophase sheets are then stacked one upon the other such that the orientation of the molecular order is maintained.

Accordingly, it is an object of the present invention to provide for enhanced directional thermal and electrical conductivity of graphitizable foams.

Other and further objects features and advantages of the present invention will be readily apparent to those skilled in the art upon a reading of the following disclosure when taken in conjunction with the accompanying drawings.

DETAILED DESCRIPTION OF THE PREFERRED EMBODIMENTS

Figure 1:
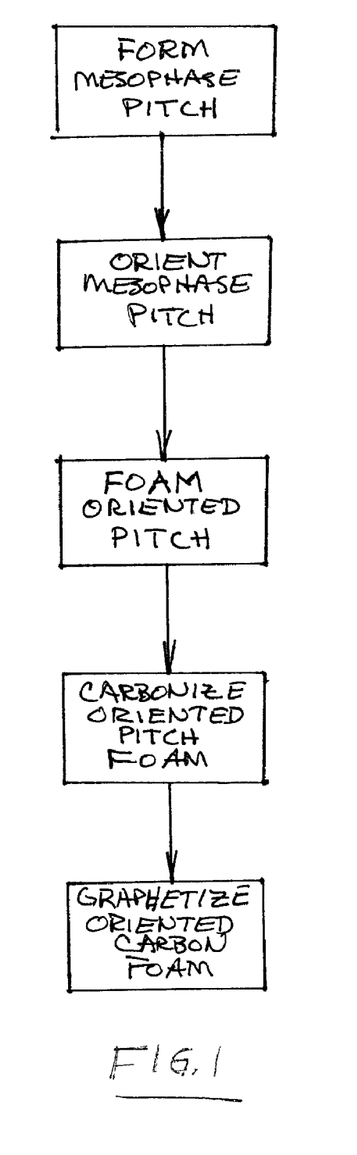
FIG. 1 is a block diagram flow chart of the process of the present invention.

The basic steps involved in the present invention are illustrated in FIG. 1 and include:

(a) providing or forming the mesophase pitch;

(b) aligning the layer planes of the mesophase portions of the mesophase pitch with each other to create an oriented mesophase pitch;

(c) foaming the oriented mesophase pitch thereby forming an oriented pitch foam;

(d) heating the oriented pitch foam to a temperature sufficient to carbonize the pitch, thereby forming an oriented carbon foam; and (e) if a graphite foam is desired, then further heating the oriented carbon foam to graphitize the foam thus providing an oriented graphite foam.

Figure 2:
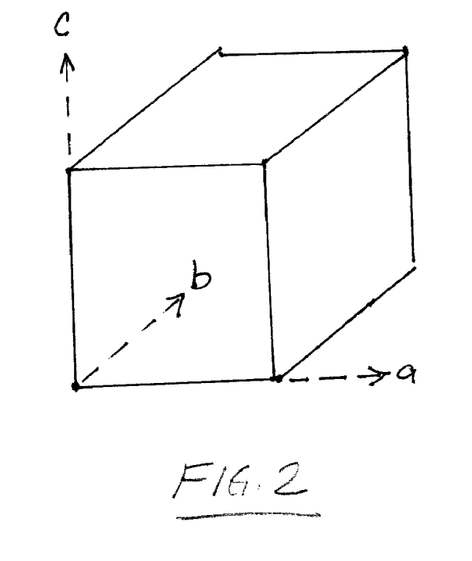
FIG. 2 is a schematic representation of a carbon foam article having a planar direction of enhanced thermal conductivity in the "a-b" plane.

FIG. 2 schematically illustrates a carbon foam article having a planar direction of enhanced thermal conductivity in the "a" and "b" axes as shown relative to a much lesser thermal conductivity in the direction normal to the planar direction, which is often referred to as the "c" direction or axis. The layer planes of the molecules are oriented generally parallel to the a-b plane.

Preferably the carbon foam article of FIG. 2 is graphitized. The thermal conductivity in the planar direction, that is in the a-b plane, of a graphitized foam article constructed in accordance with the present invention can be 300 W/mK or higher; indeed, the thermal conductivity in the a-b plane can be 350 W/mK or higher. The planar thermal conductivity can be as high as 550 W/mK or even as high as 800 W/mK or even higher. By contrast, the thermal conductivity in the "c" direction may be in the range of 10 to 100 W/mK. It should be noted that thermal conductivity of the bulk article will depend on density. These values presented are for a foam of density of approximately 0.5 g/cc.

As will be described in detail below, in a first embodiment illustrated in FIGS. 3-7, preferably steps (a) (b) (c) and (d) are all performed while providing relative rotation between the pitch and a magnetic field so as to optimize the degree of orientation of the pitch as it transitions through its various phases through the process.

In a second embodiment described below and illustrated in FIGS. 8-9, step (b) is formed by calendering molten mesophase pitch to impart a preferred orientation of molecular ordering parallel to the plane of the sheet, and then the mesophase sheets are stacked one upon the other such that the orientation of the molecular ordering is maintained. The sheets are then rotated 90° and positioned in a pressure vessel or furnace and subjected to a foaming operation. Rotating the calendered sheets 90° orients the mesophase domains to be in the "rise" direction during foaming. Because the mesophase pitch was highly oriented before foaming, subsequent orientation is maintained during and after foaming, as well as during additional heat treatment.

FIGS. 3-7: Orienting The Mesophase Pitch By Rotation In A Magnetic Field

While it is possible to first prepare a mesophase pitch and then align the mesophase portions of the pitch by subjecting the pitch to rotational motion relative to a surrounding magnetic field, in order to facilitate production of the desired alignment, it is preferable to subject the pitch to such rotational motion during the entire time that the mesophase is being formed.

Figure 5:
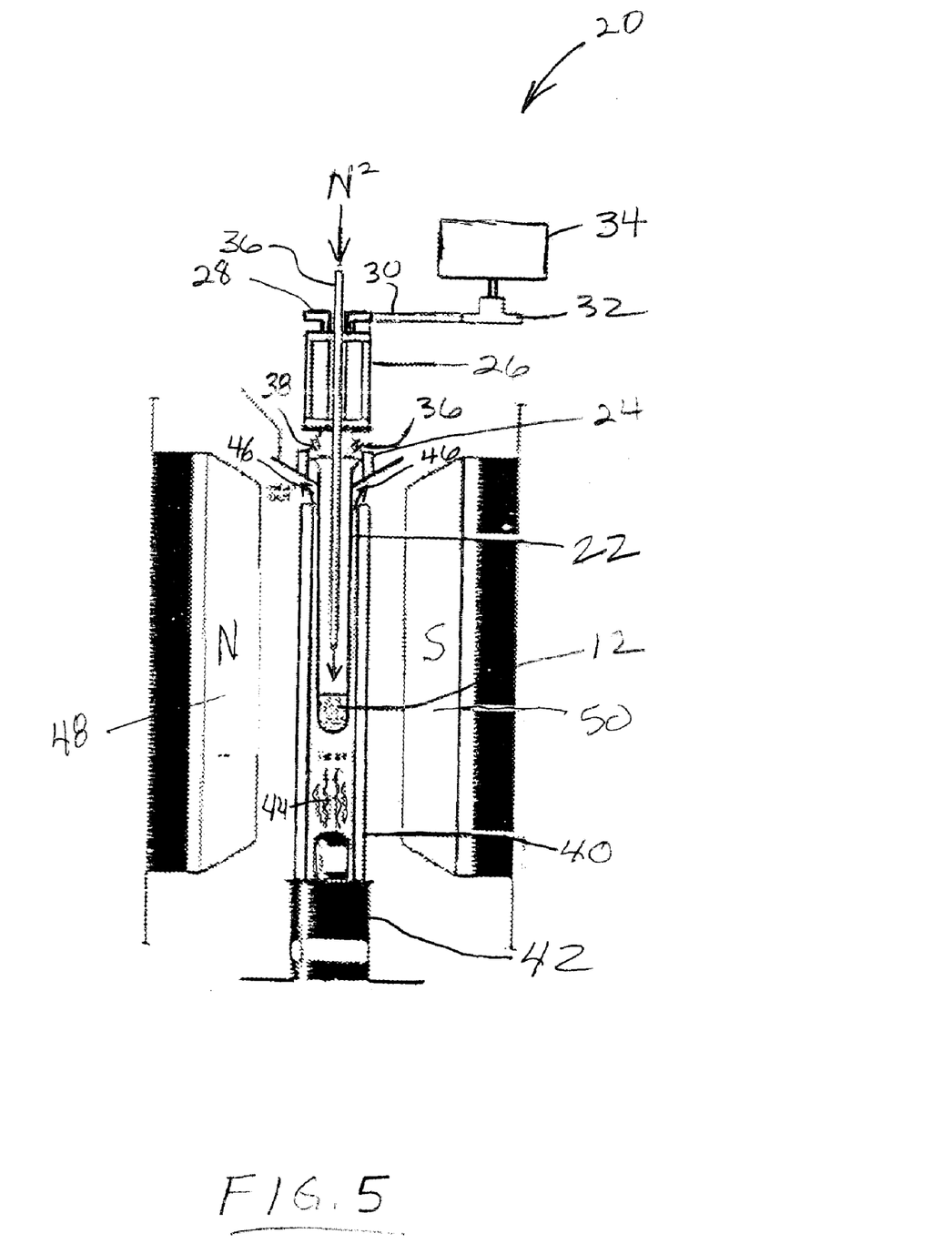
FIG. 5 is a schematic illustration of an apparatus for rotating a container of molten mesophase pitch in a magnetic field.
Figure 6:
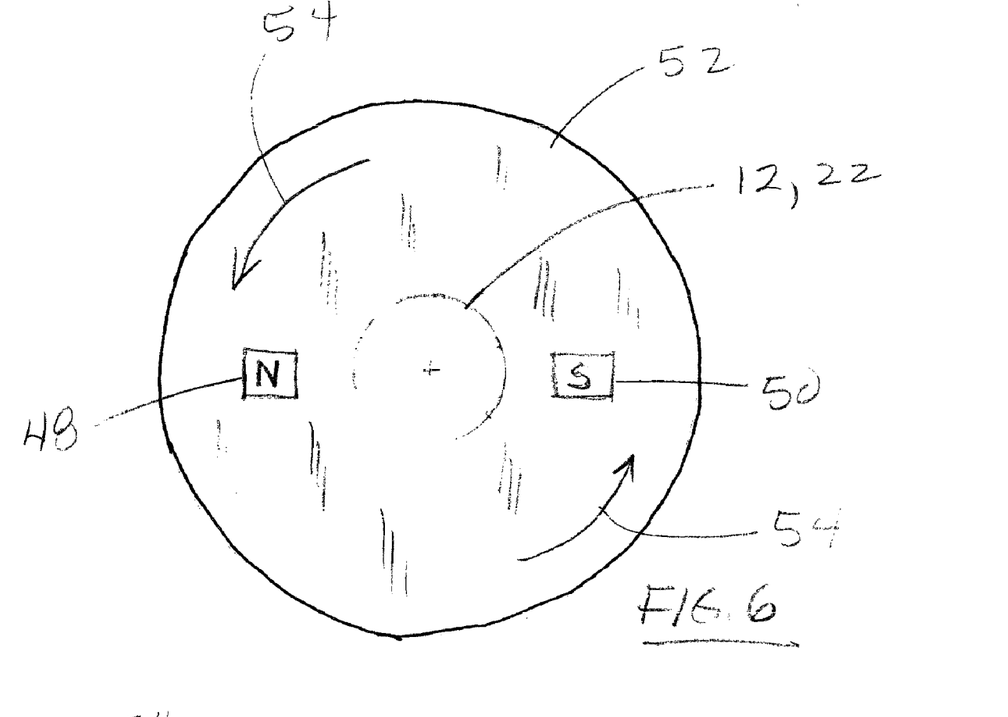
FIG. 6 is a schematic plan view of a pitch sample and magnet arrangement similar to FIG. 4, except with the magnets being mounted to rotate relative to the pitch sample.
Figure 7:
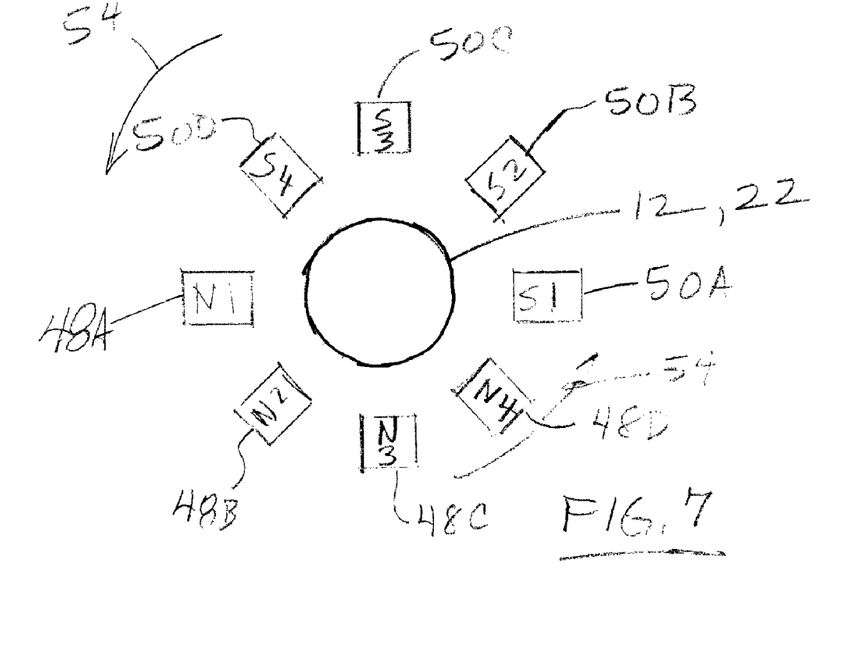
FIG. 7 is a schematic plan view of an alternative embodiment similar to FIG. 6 wherein the rotating magnetic field is provided by switching between a series of magnetic poles located about the circumference of the pitch sample.

Alignment of the mesophase portions of the pitch in accordance with the instant invention is effected by rotating the pitch in its molten state about an axis perpendicular to the direction of a surrounding magnetic field (see FIGS. 3-5) or, alternatively, rotating the magnetic field itself about such axis (see FIGS. 6-7). The strength of the magnetic field and the rate of rotation of the pitch, or the field, must be such as will subject the pitch to a diamagnetic force which tends to align the layer planes of the mesophase portions of the pitch in a direction parallel to that of the magnetic field, and the c-axes of said layer planes parallel to the axis of rotation. These parameters thus depend to a large extent upon a number of factors including the size of the mesophase spheres or domains, the viscosity of the isotropic phase of the pitch, and the temperature employed. Preferably, the pitch is rotated relative to the magnetic field at a rate of at least 1 rpm in a field of at least 1 kilogauss in order to effect the desired alignment. Most preferably, the pitch is rotated at a rate of from 2 rpm to 100 rpm in a magnetic field of at least 2 kilogauss.

Mesophase pitches can be produced in accordance with known techniques by heating a carbonaceous pitch in an inert atmosphere at a temperature above about 350° C. for a time sufficient to produce the desired quantity of mesophase. By an inert atmosphere is meant an atmosphere which does not react with the pitch under the heating conditions employed, such as nitrogen, argon, xenon, helium, and the like. The heating period required to produce the desired mesophase content varies with the particular pitch and temperature employed, with longer heating periods required at lower temperatures than at higher temperatures. At 350° C., the minimum temperature generally required to produce mesophase, at least one week of heating is usually necessary to produce a mesophase content of about 40 percent. At temperatures of from about 400° C. to 450° C., conversion to mesophase proceeds more rapidly, and a 50 percent mesophase content can usually be produced at such temperatures within about 1-40 hours. Such temperatures are preferred for this reason. Temperatures above about 500° C. are undesirable, and heating at this temperature should not be employed for more than about 5 minutes to avoid conversion of the pitch to coke.

Aromatic base carbonaceous pitches having a carbon content of from about 92 percent by weight to about 96 percent by weight and a hydrogen content of from about 4 percent by weight to about 8 percent by weight are generally suitable for producing mesophase pitches. Elements other than carbon and hydrogen, such as oxygen, sulfur and nitrogen, are undesirable and should not be present in excess of about 4 percent by weight. The presence of more than such amount of extraneous elements may disrupt the formation of carbon crystallites and prevent the development of a graphitic-like structure when attempts are made to carbonize or graphitize the pitch. In addition, the presence of extraneous elements reduces the carbon content of the pitch and hence the ultimate yield of the carbonized or graphitized product. When such extraneous elements are present in amounts of from about 0.5 percent by weight to about 4 percent by weight, the pitches generally have a carbon content of from about 92-95 percent by weight, the balance being hydrogen.

Petroleum pitch, coal tar pitch, coal extracts, and certain synthetic pitches such as naphthalene or acenaphthylene pitch are preferred starting materials for producing mesophase pitches. Petroleum pitch, of course, is the residuum carbonaceous material obtained from the distillation of crude oils or the catalytic cracking of petroleum distillates. Coal tar pitch is similarly obtained by the distillation of coal. Both of these materials are commercially available natural pitches. Coal extracts can be obtained by the hydrogenation of coal as in direct coal liquefaction. Naphthalene pitch can be obtained by catalytic polymerization using Lewis acids. Acenaphthylene pitch, on the other hand, can be produced by the pyrolysis of polymers of acenaphthylene as described by Edstrom et al. in U.S. Pat. No. 3,574,653, the details of which are incorporated herein by reference.

Figure 3:
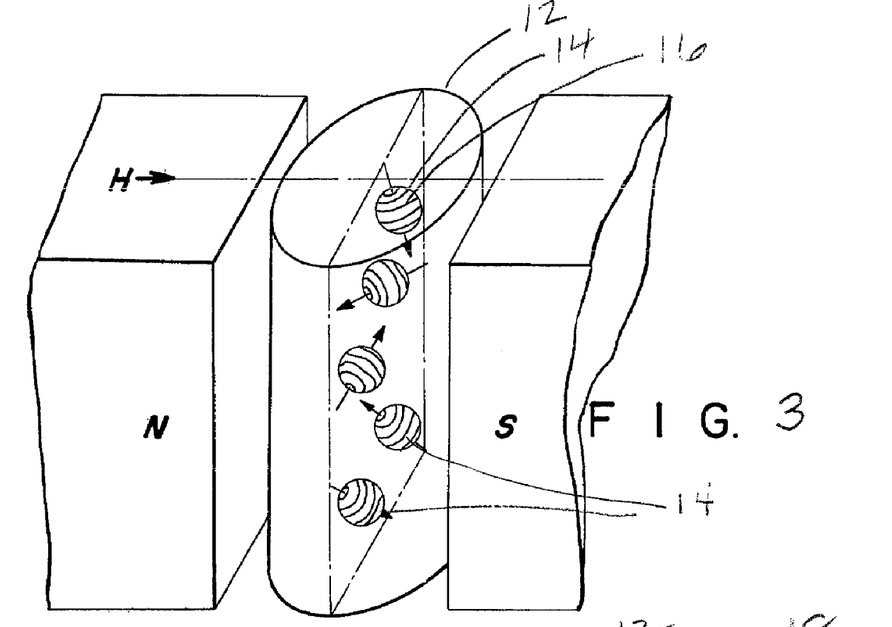
FIG. 3 is a schematic diagram illustrating the orientation of mesophase spheres in a pitch subjected to magnetic field (H).

FIG. 3 schematically illustrates a sample 12 of mesophase pitch having mesophase portions 14, each mesophase portion comprising layer planes 16 of aligned molecules. While the layer planes of all the spheres are aligned parallel to the direction of magnetic field H, the polar or c-axes of the spheres are randomly oriented relative to each other.

Figure 4:
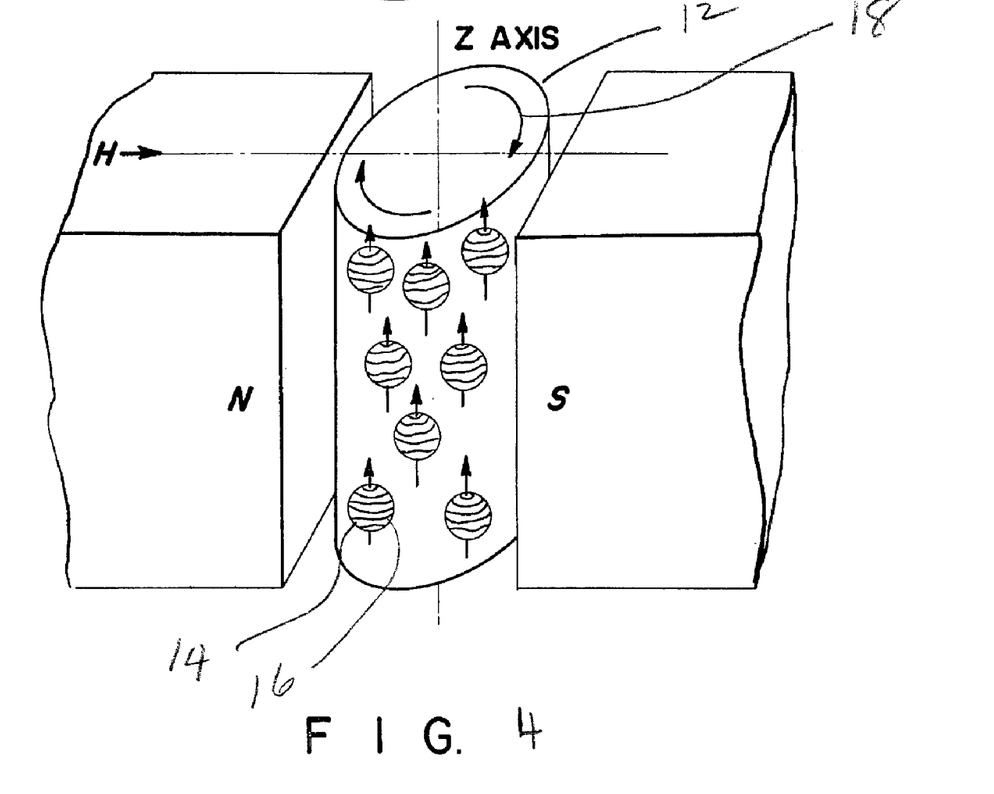
FIG. 4 is a schematic diagram illustrating the orientation of mesophase spheres in a molten pitch which has been rotated about axis (Z) perpendicular to magnetic field (H).

In FIG. 4, in which the sample 12 is being rotated within the magnetic field as indicated by the arrows 18, not only are the layer planes 16 of the spheres 14 aligned parallel to the direction of magnetic field H, but, in addition, the polar or c-axes of the planes 16 are all aligned parallel to the axis of rotation of the pitch sample 12. The alignment of the polar axes of the spheres 14 in a direction parallel to the axis of rotation is a result of the propensity of the spheres to maintain, without interruption by rotation of the pitch, the orientation in which their layer planes are parallel to the direction of the magnetic field.

Referring now to FIG. 5, a schematic representation is shown of one apparatus 20 for rotating the sample 12 within the magnetic field as described above with regard to FIG. 4.

In the apparatus 20, the sample 12 is contained in a rotating test tube 22. The test tube 22 is held by a rotating carrier 24 which is attached to a ball bearing shaft support 26. Attached to the shaft support 26 is a sprocket 28 which is driven by a chain 30 which is in turn driven by a second sprocket 32 driven by electric motor 34.

A nitrogen injection tube 36 extends downward through the rotating assembly into the test tube 22 to provide nitrogen or other inert gas into the test tube 22. The nitrogen is vented from the test tube 22 at vents 36 and 38.

The test tube 22 rotates within an evacuated transfer tube 40. A heat source 42 which may, for example, be a Raytheon heat gun capable of providing temperature up to 550° C., is mounted in the lower end of the transfer tube 40. Heat from the heat source 42 flows upward to heat the test tube 22 and sample 12 within the transfer tube 40, as indicated at 44. Heat exits the upper end of transfer tube 40 in the small annulus between test tube 22 and transfer tube 40 as indicated by arrows 46.

The test tube 22 and sample 12 rotate within a magnetic field which exists between north and south poles 48 and 50 of a magnet assembly.

FIG. 6 schematically illustrates an alternative version of the apparatus 20 within which the north and south pole magnets 48 and 50 are mounted on a turntable 52 which rotates as indicated by arrows 54 relative to a stationary pitch sample 12 contained within stationary container 22.

FIG. 7 illustrates still another alternative embodiment in which the pitch sample 12 is located within a stationary container 22 in which a rotating magnetic field rotating in the direction of arrows 54 is created by electrically switching between a plurality of pairs of magnetic poles. By initially providing electric current to electromagnetic poles N1-S1 and then switching sequentially to N2-S2, then N3-S3, then N4-S4, then back to N1-S1 etc., a rotating magnetic field can be created without actually mechanically rotating any of the components.

Foaming Of The Oriented Mesophase Pitch

In general, the oriented mesophase pitch can be foamed by any known process. Two such suitable processes are the process of Kearns U.S. Pat. No. 5,868,974 discussed in detail above, wherein an inert gas foaming agent is injected into the pitch and subsequently flashed to foam the pitch, and the process of Klett U.S. Pat. No. 6,033,506 wherein the oriented pitch can be heated to a temperature sufficient to cause gasses to evolve directly from the pitch and foam the pitch.

Either of these processes or any other available foaming process may be performed on the oriented pitch either with or without continuing to rotate the oriented pitch within a magnetic field. If rotation is discontinued prior to the foaming process, much of the orientation within the pitch will be maintained. That orientation can be optimized, however, by continuing to rotate the oriented pitch within the magnetic field during the foaming process, and during the carbonizing of the oriented foam pitch.

If a foaming process similar to that of the Kearns U.S. Pat. No. 5,868,974 is utilized, the foaming process can be achieved by:

introducing inert gas under pressure into the vessel containing the oriented pitch to obtain a final pressure within the pressure vessel of about 1,000 to 1,500 psi;

holding the pressure vessel under pressure for about 10 to 40 minutes; and venting the pressure vessel to atmospheric pressure, thereby providing a porous pitch foam.

The oriented pitch foam can then be carbonized by heating the porous pitch foam in an inert atmosphere to a temperature sufficient to carbonize the pitch thereby providing an oriented carbon pitch; and If a graphitized foam is desired, this is accomplished by further heating the oriented carbon foam in the inert atmosphere to a further temperature sufficient to graphitize the pitch thus providing an oriented graphitized foam.

If a foaming process similar to that of Klett U.S. Pat. No. 6,033,506 is to be utilized, the injection of the blowing agent can be eliminated, and the oriented pitch is heated to a temperature sufficient to cause gasses to evolve directly from the pitch and to foam the pitch.

Figure 8:
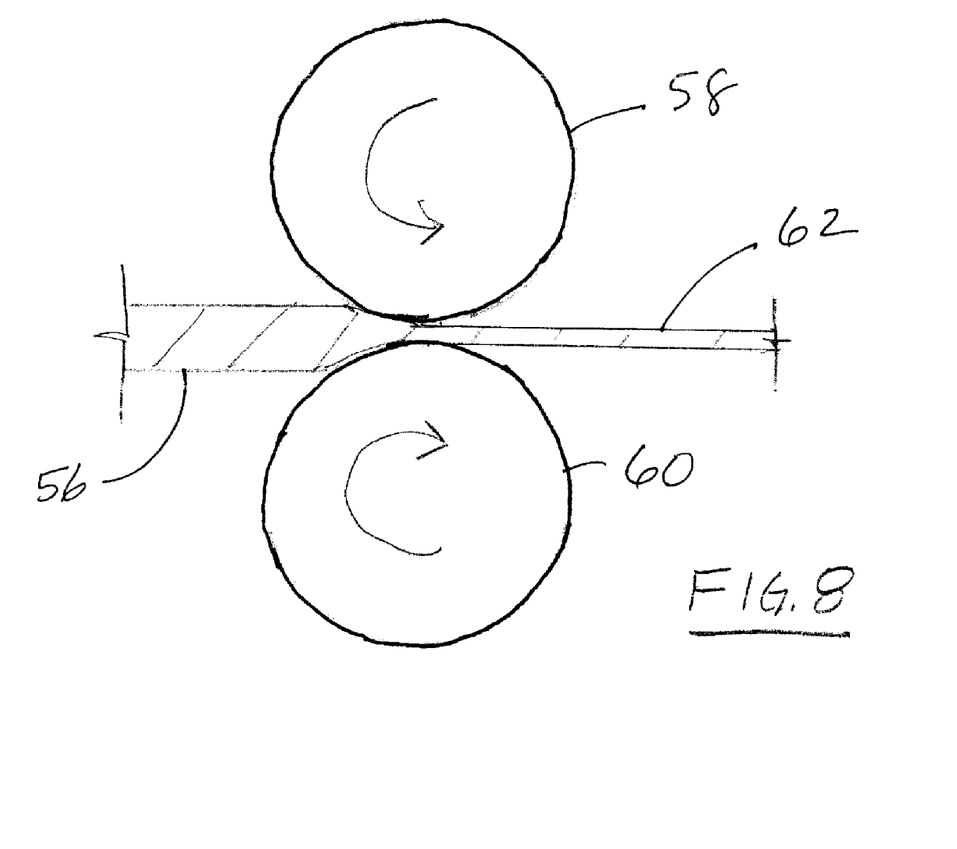
FIG. 8 is a schematic view of the calendering step in an alternative embodiment of the invention wherein the mesophase pitch is oriented by calendering the mesophase pitch to impart a preferred orientation of molecular ordering parallel to the plane of the sheet.
Figure 9:
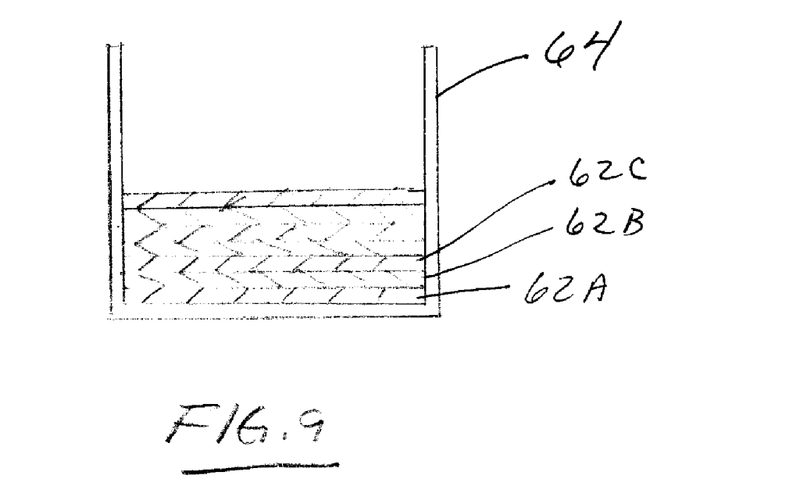
FIG. 9 is a schematic illustration of a plurality of sheets formed by the calendering step of FIG. 8 which have been stacked upon one another within a pressure vessel.

Alternative Embodiment of FIGS. 8-9

FIGS. 8 and 9 illustrate an alternative manner in which the mesophase pitch can be provided and oriented.

FIG. 8 illustrates a quantity 56 of mesophase pitch being calendered between calendering rolls 58 and 60 to form a sheet 62 of calendered mesophase pitch within which the layer planes of the mesophase portion of the mesophase pitch are oriented parallel to the plane of the sheet 62 due to the physical manipulation achieved by the calendering action. In FIG. 9, the sheet 62 of calendered mesophase pitch has been cut into a plurality of sheets 62A, 62B, 62C, etc. which are stacked one upon the other in a pressure vessel or furnace 64. The stacked calendered sheets 62 are heated under pressure within vessel 64 to above their melting temperature, and are then foamed. The foaming can be accomplished in accordance with processes substantially similar to the Kearns process or the Klett process described above. Because the mesophase pitch was highly oriented before foaming, subsequent orientation is maintained during and after foaming, as well as during additional heat treatment. The foamed pitch created by the process illustrated in FIGS. 8 and 9 is further heat treated to carbonize the same, and even further heat treated to graphitize the same as desired.

Additionally, additives to the mesophase pitch can further improve conductivity. For instance, the addition of carbon nanotubes, carbon fibers, graphite particles, natural flake graphite or even metal fibers like nickel or steel fibers can be added to increase thermal or electrical conductivity, such as at a level of between about 2% and about 5% by weight. It will be recognized that, when the resulting foam is to be graphitized, however, that non-carbon additives may vaporize, rendering their effect nominal.

All patents referred to above are incorporated herein by reference in their entirety.

Thus it is seen that the apparatus and methods of the present invention readily achieve the ends and advantages mentioned as well as those inherent therein. While certain preferred embodiments of the invention have been illustrated and described for the purposes of the present disclosure, numerous changes in the construction and arrangement of parts and steps may be made by those skilled in the art, which changes are encompassed within the scope and spirit of the present claims.

What is claimed is:

1. A process for manufacturing a carbon foam with enhanced directional thermal conductivity, comprising:
   (a) providing a mesophase pitch having mesophase portions, each mesophase portion comprising layer planes of aligned molecules;
   (b) aligning the layer planes of the mesophase portions of the mesophase pitch with each other to create an oriented mesophase pitch by exposing the mesophase pitch to a magnetic field;
   (c) foaming the oriented mesophase pitch thereby forming an oriented pitch foam with enhanced thermal conductivity in directions corresponding to the orientation of the layer planes of the mesophase portions of the mesophase pitch; and
   (d) heating the oriented pitch foam to a temperature sufficient to carbonize the pitch, thereby forming an oriented carbon foam.

2. The process of claim 1, further comprising:
graphitizing the oriented carbon foam of step (d).

3. The process of claim 1, wherein:
step (b) further comprises providing relative rotation between a molten mesophase pitch and a magnetic field.

4. The process of claim 3, wherein:
step (a) comprises forming the mesophase pitch while providing relative rotation between the mesophase pitch and the magnetic field, so that steps (a) and (b) occur at least partially simultaneously.

5. The process of claim 3, wherein:
step (c) is conducted while providing relative rotation between the mesophase pitch and the magnetic field.

6. The process of claim 3, wherein:
step (d) is conducted while providing relative rotation between the oriented pitch foam and the magnetic field.

* * * * *